United States Patent Office.

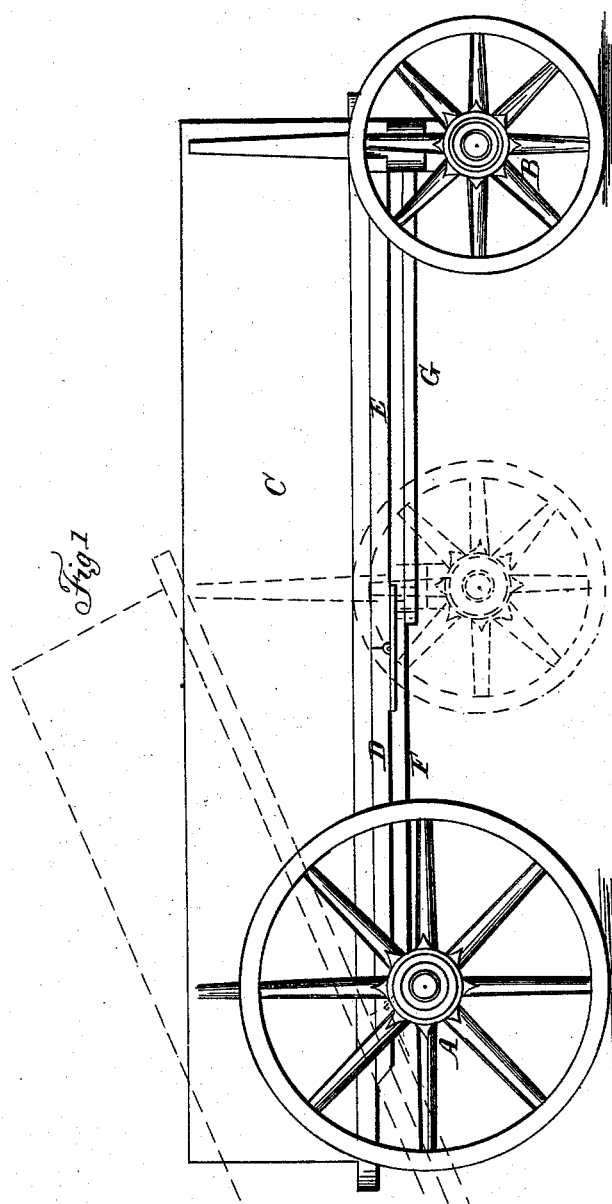

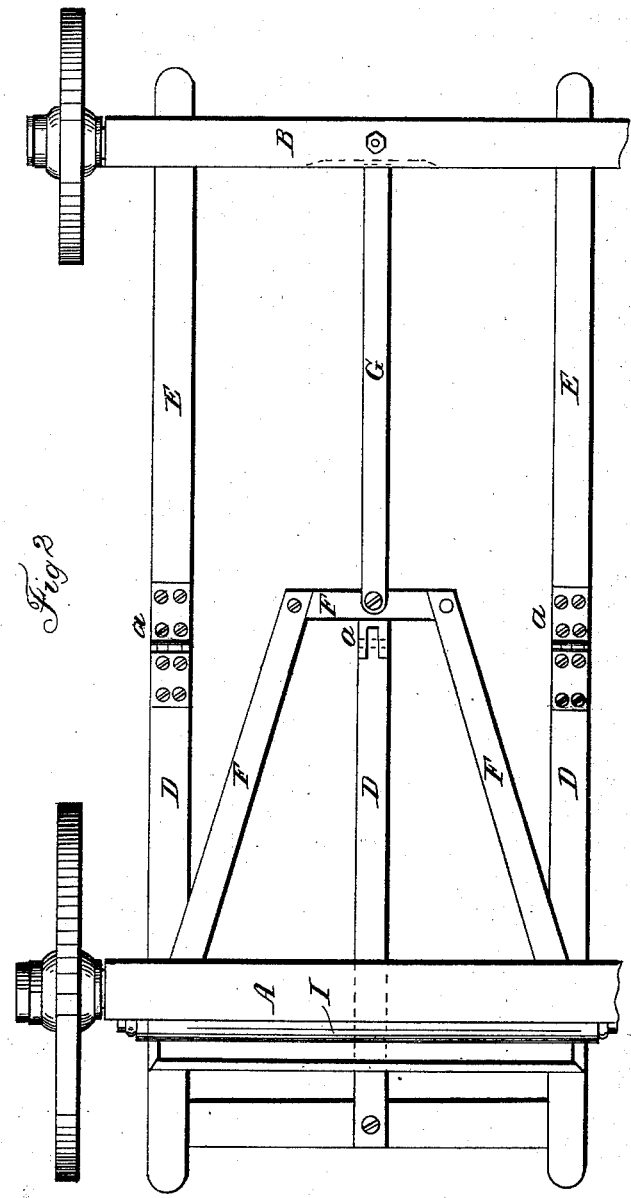

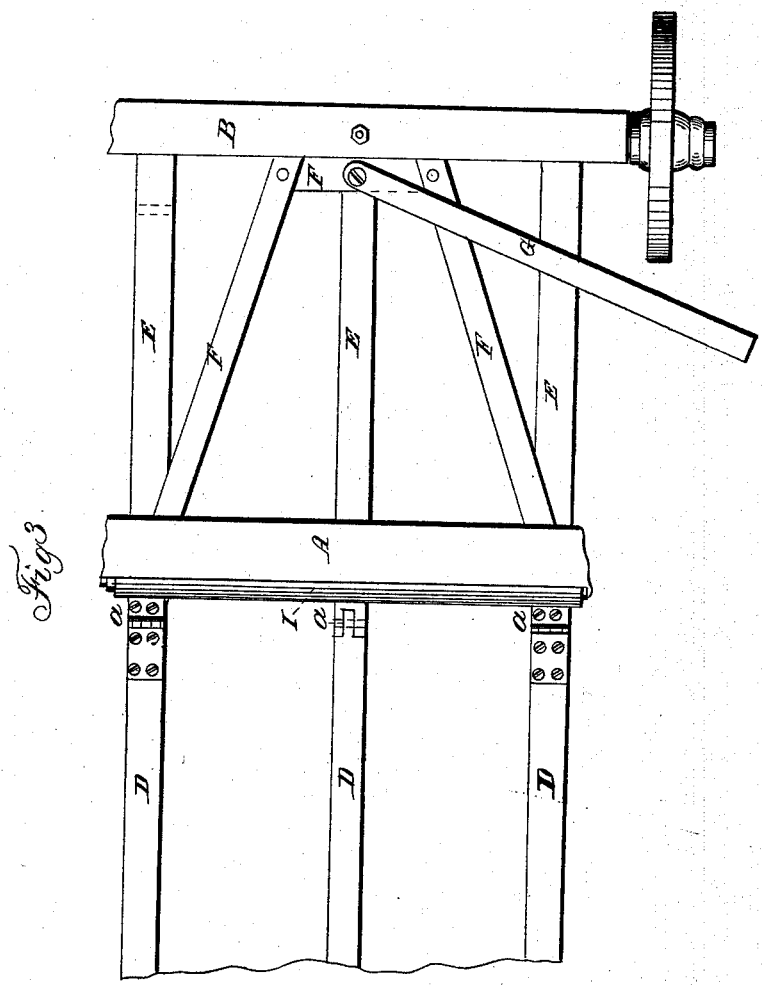

GEORGE N. MUNGER, OF NEW HAVEN, CONNECTICUT.

Letters Patent No. 61,948, dated February 12, 1867.

---

IMPROVEMENT IN DUMPING WAGON.

---

The Schedule referred to in these Letters Patent and making part of the same.

---

TO ALL WHOM IT MAY CONCERN:

Be it known that I, GEORGE N. MUNGER, of New Haven, in the county of New Haven, and State of Connecticut, have invented a new Improvement in Tilting Wagons; and I do hereby declare the following, when taken in connection with the accompanying drawings, and the letters of reference marked thereon, to be a full, clear, and exact description of the same, and which said drawings constitute part of this specification, and represent, in—

Figure 1, a side view.

Figure 2, a view from the under side looking up; and in

Figure 3 a similar view as in position for tilting.

This invention is designed for an arrangement for tilting the body of a wagon by holding the rear wheels and running back the forward wheels, the body being attached to the forward wheels, and so that when the body is run back sufficiently the body may be easily tilted, and then, by a forward movement of the forward wheels, the body is again brought into an upright position upon the four wheels; and to enable others skilled in the art to construct and use my improvement, I will proceed to describe the same as illustrated in the accompanying drawings.

A is the rear axle; B the forward axle, each constructed and provided with wheels in the usual manner. C, the body, is formed upon a framework, D, fixed to the body, and the corresponding parts E of the said framework fixed to the forward axle, and the two parts together hinged at $a$. The two axles are extended and held in their proper relative positions by a framework, F, attached to the rear axle and extending midway of the body, and from there by a bar, G, pivoted to the framework F, extending to the forward axle, the said bar G turning into a groove formed in the forward axle, as denoted by the broken lines, fig. 2, so as to be readily turned to either side, as seen in fig. 3, or other equivalent device for holding the axles in their proper relative positions. When the two axles are thus extended the body is firm, as seen in fig. 1; but when it is desired to tilt the body to discharge the contents therefrom, turn the bar G to one side, as seen in fig. 3, (or disengage whatever arrangement may be employed for extending the axles,) then, holding the rear wheels, run back the forward wheels, as denoted in red, fig. 1, and in fig. 3, until the hinged points of the framework have passed over the axle, then the body will or may be tilted to the position denoted in red, fig. 1. I fix a roller, I, upon the rear axle, so that the body passes over the axle with very little friction; and when the contents have been discharged, to return the body, hold the rear wheels and draw the forward wheels, and with them the body, to their original position, as seen in figs. 1 and 2; there secure the two axles in their proper relative positions until it is again desired to tilt the body.

I do not broadly claim constructing a four-wheel wagon so that the body can be tilted, as such is not new; but having thus fully described my invention, what I do claim as new and useful, and desire to secure by Letters Patent, is—

The framework D and E which supports the body, the one part being fixed to the body and the other to the forward axle, and the two parts hinged together and combined with a device for securing the two axles in their proper relative positions, the whole constructed and arranged so as to operate substantially in the manner and for the purpose specified.

GEO. N. MUNGER.

Witnesses:
JOHN E. EARLE,
A. J. TIBBITS.